(12) United States Patent
Madireddi et al.

(10) Patent No.: US 10,576,806 B1
(45) Date of Patent: Mar. 3, 2020

(54) AUXILIARY HVAC SYSTEM FOR VEHICLE SLEEPER COMPARTMENT

(71) Applicant: Nurturenergy Inc., St. Charles, MO (US)

(72) Inventors: Sesha C. Madireddi, St. Charles, MO (US); Sainath Kouda, Maryland Heights, MO (US); Meena Murugasundaram, Chesterfield, MO (US)

(73) Assignee: DClimate, Inc., St. Charles, MO (US)

( * ) Notice: Subject to any disclaimer, the term of this patent is extended or adjusted under 35 U.S.C. 154(b) by 295 days.

(21) Appl. No.: 15/462,130

(22) Filed: Mar. 17, 2017

Related U.S. Application Data

(60) Provisional application No. 62/309,771, filed on Mar. 17, 2016.

(51) Int. Cl.
| | | |
|---|---|---|
| *F25B 49/00* | (2006.01) | |
| *B60H 1/00* | (2006.01) | |
| *B62D 33/06* | (2006.01) | |
| *B60H 1/32* | (2006.01) | |

(52) U.S. Cl.
CPC ..... *B60H 1/00378* (2013.01); *B60H 1/00007* (2013.01); *B60H 1/00742* (2013.01); *B60H 1/00764* (2013.01); *B60H 1/3232* (2013.01); *B62D 33/0612* (2013.01)

(58) Field of Classification Search
CPC ............ B60H 1/00378; B60H 1/00764; B60H 1/00742; B60H 1/00007; B60H 1/3232; B62D 33/0612

USPC ........................................................... 62/229
See application file for complete search history.

(56) References Cited

U.S. PATENT DOCUMENTS

| | | | | |
|---|---|---|---|---|
| 5,333,678 | A * | 8/1994 | Mellum | B60H 1/00378 122/26 |
| 5,901,780 | A | 5/1999 | Zeigler et al. | |
| 6,116,037 | A * | 9/2000 | Burnett | B60H 1/00378 62/239 |
| 6,620,039 | B1 | 9/2003 | Tao et al. | |
| 6,663,010 | B2 * | 12/2003 | Chene | B60H 1/00642 236/51 |
| 6,932,148 | B1 * | 8/2005 | Brummett | B60H 1/00378 123/142.5 R |
| 7,049,707 | B2 * | 5/2006 | Wurtele | B60H 1/00378 290/1 A |
| 7,150,159 | B1 * | 12/2006 | Brummett | B60H 1/00378 62/236 |
| 7,237,397 | B2 | 7/2007 | Allen | |
| 7,316,119 | B2 | 1/2008 | Allen | |

(Continued)

*Primary Examiner* — Claire E Rojohn, III
(74) *Attorney, Agent, or Firm* — Grace J. Fishel

(57) ABSTRACT

A battery powered auxiliary HVAC system designed to heat and cool at least a sleeper compartment of a vehicle such as a truck with a management system for conserving battery power. The management system includes a processor connected to temperature sensors, motion sensors, occupancy sensors, etc. for controlling a variable speed compressor, evaporator fan and condenser fan. A fuel fired heater is positioned between an evaporator coil in the inlet of an enclosure and the evaporator fan in an outlet of the enclosure such that air flow passes around the heater. The power electronics to operate the system may be actively cooled by connection tubing providing a heat sink between an evaporator outlet and a compressor inlet.

12 Claims, 15 Drawing Sheets

(56) References Cited

U.S. PATENT DOCUMENTS

| | | | | |
|---|---|---|---|---|
| 7,766,247 B2* | 8/2010 | Wilnechenko | B63J 2/12 | 165/41 |
| 7,891,575 B2* | 2/2011 | Sami | B60H 1/00364 | 165/10 |
| 8,424,776 B2* | 4/2013 | Veettil | B60H 1/3226 | 237/12.3 A |
| 8,863,540 B2* | 10/2014 | Alston | B60H 1/00428 | 165/43 |
| 8,927,905 B1* | 1/2015 | Sunday | B60H 1/00428 | 219/208 |
| 8,938,331 B2* | 1/2015 | Oakes | G06Q 40/00 | 701/36 |
| 2002/0014329 A1* | 2/2002 | Carr | B60H 1/005 | 165/201 |
| 2003/0034147 A1* | 2/2003 | Houck | B60H 1/3226 | 165/42 |
| 2003/0070849 A1* | 4/2003 | Whittaker | B60H 1/3226 | 180/68.2 |
| 2005/0035657 A1* | 2/2005 | Brummett | B60H 1/3226 | 307/10.1 |
| 2005/0198986 A1* | 9/2005 | Allen | B60H 1/00378 | 62/244 |
| 2005/0210903 A1* | 9/2005 | Allen | B60H 1/00378 | 62/244 |
| 2007/0114292 A1* | 5/2007 | Breed | B60H 1/00742 | 236/49.3 |
| 2007/0299560 A1* | 12/2007 | LaHue | B60H 1/00378 | 700/276 |
| 2008/0110185 A1* | 5/2008 | Veettil | B60H 1/3226 | 62/115 |
| 2008/0134715 A1* | 6/2008 | Lewis | B60H 1/2209 | 62/498 |
| 2008/0245503 A1* | 10/2008 | Wilson | B60H 1/00371 | 165/42 |
| 2009/0090118 A1* | 4/2009 | Pham | F04B 39/06 | 62/228.5 |
| 2011/0238222 A1* | 9/2011 | Nikovski | F24F 11/62 | 700/276 |
| 2013/0061621 A1* | 3/2013 | Nielsen | B60H 1/00257 | 62/236 |
| 2013/0332013 A1* | 12/2013 | Malone | B60H 1/004 | 701/22 |
| 2014/0116642 A1* | 5/2014 | Courtney | B60H 1/00378 | 165/42 |
| 2014/0262132 A1* | 9/2014 | Connell | B60H 1/00457 | 165/11.1 |
| 2015/0129192 A1* | 5/2015 | Boss | B60H 1/00771 | 165/202 |
| 2015/0153092 A1* | 6/2015 | Urbain | B64F 1/364 | 62/89 |
| 2015/0168032 A1* | 6/2015 | Steele | B60P 3/20 | 62/61 |
| 2015/0184912 A1* | 7/2015 | Nelson | F25B 31/02 | 62/56 |
| 2016/0144692 A1* | 5/2016 | Brown | B60H 1/3226 | 62/89 |
| 2017/0082355 A1* | 3/2017 | Trout | F25D 31/007 | |
| 2017/0144548 A1* | 5/2017 | Ferguson | B60H 1/3211 | |
| 2017/0232817 A1* | 8/2017 | Hutchison | B60P 3/20 | 165/42 |
| 2018/0344051 A1* | 12/2018 | Schaefer | A47F 1/12 | |
| 2018/0355906 A1* | 12/2018 | Schaefer | F16B 47/00 | |
| 2019/0100080 A1* | 4/2019 | Lattin | B60H 1/3407 | |

* cited by examiner

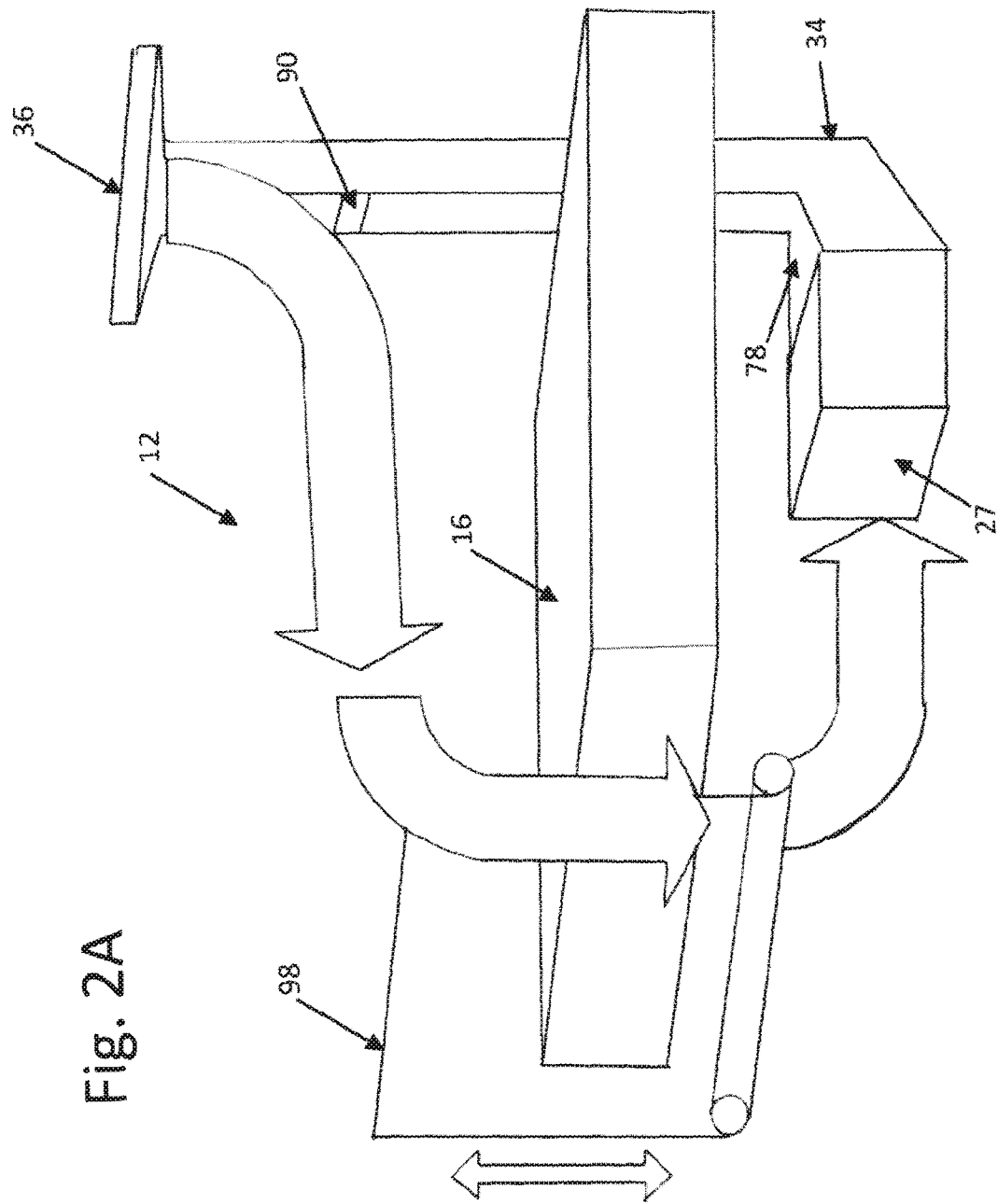

AUXILIARY HVAC SYSTEM FOR VEHICLE SLEEPER COMPARTMENT

BACKGROUND OF THE INVENTION

Field of the Invention

The present invention relates to a DC powered, auxiliary HVAC system that integrates the delivery of air conditioning and heating into one assembly. A processor optimizes heating, cooling and air circulation to manage battery use and optimize occupant comfort.

Brief Description of the Prior Art

The primary HVAC system in motor vehicles, such as commercial trucks in classes 5 through 8 with a sleeper compartment, may need to be shut off when the truck is parked because idling is outlawed by some state and local municipalities. While there are fuel fired air auxiliary HVAC systems their use is also prohibited in some cases. Commercially available DC powered HVAC systems do not integrate air conditioning and heating into a single unit and use separate ducting systems. In addition, they require modification to the existing truck cab, are difficult to service and have simple human machine interfaces (HMI) which makes system function, control and optimization difficult or impossible.

Customers have complained that existing DC powered HVAC systems take up significant space in the sleeper compartment which otherwise may be used as a driver storage area. They also have complained about inadequate comfort control and limited runtime during hot weather. Some of these deficits are due to system hardware layout and design but also are in large part caused by inadequate system control.

BRIEF SUMMARY OF THE INVENTION

In view of the above, it is an object of the present invention to provide a battery operated HVAC system that delivers air conditioning and heating in one assembly. It is another object to provide a battery management system for occupant comfort and to extend runtime.

An integrated HVAC system powered by a DC battery source and adapted to heat and cool at least a sleeper compartment of a vehicle provides an integrated fuel operated heater, air cooling and air handling unit adapted to facilitate air flow with respect to an evaporator coil and fuel fired heater to provide conditioned air at least in a sleeper compartment where both heating system and cooling system are housed within the same enclosure and airflow through the heating system and air conditional evaporator is provided by the same air circulation fan. The compressor, evaporator fan and condenser fan have DC powered variable motors controlled by a processor.

In some embodiments, the system operation may be limited or ceased when vehicle motion is detected by an accelerometer. The operation of the air delivery system within the conditioned spaced may have a cyclically variable volume of air to promote an improved sense of comfort while the temperature in the sleeper compartment more closely approaches ambient temperature thereby reducing energy consumption.

The system can provide zone heating or cooling to the occupant depending on user preferences, user location within the conditioned space and user motion within the conditioned space.

In some embodiments, the system can detect the present and movement of the occupant and automatically configure zone heating or cooling to provide the occupant with maximum cooling at minimum power consumption.

Zone cooling can be further improved by operable curtains, barriers or air nozzles to allow the occupant to direct conditioned air more toward the occupant and away from regions that do not benefit from heating and cooling.

A processor within the system may collect real time performance data of the system and provide various system performance metrics such as cooling performance and compressor operation and provide a continuous comparison of current system performance and faulty system performance. This data may be used to establish what subsystem of the total system needs service and the urgency of the need for service.

The processor within the system may have an internal clock and the clock can be set to local time either by the user or electronically updated via a telematic connection. The real time clock onboard the system can be used in conjunction with immediate ambient temperature conditions and assumed diurnal temperature cycles to adjust air conditioning and heating system control parameters in order to optimize the time the system is able to provide adequate heating or cooling while simultaneously optimizing the comfort level to the occupant and providing the heating and cooling comfort with a defined or minimum quantity of electrical energy.

The processor may also interface with an external information provider via a telematic connection and obtain predictions about future weather. This may allow the processor to better adjust air conditioning and heating system control parameters in order to optimize the time that the system is able to provide adequate heating or cooling while simultaneously optimizing the comfort level to the occupant.

The power electronics required to operate the system are actively cooled as refrigerant flows through connection tubing between the evaporator outlet and the compressor inlet.

BRIEF DESCRIPTION OF THE SEVERAL VIEWS OF THE DRAWINGS

In the accompanying drawings, in which several of various possible embodiments of the invention are illustrated, corresponding reference characters refer to corresponding parts throughout the several views of the drawings in which:

FIG. 2A is diagram showing air flow in the sleeper compartment;

DETAILED DESCRIPTION OF AT LEAST ONE PREFERRED EMBODIMENT OF THE INVENTION

Figure 1:
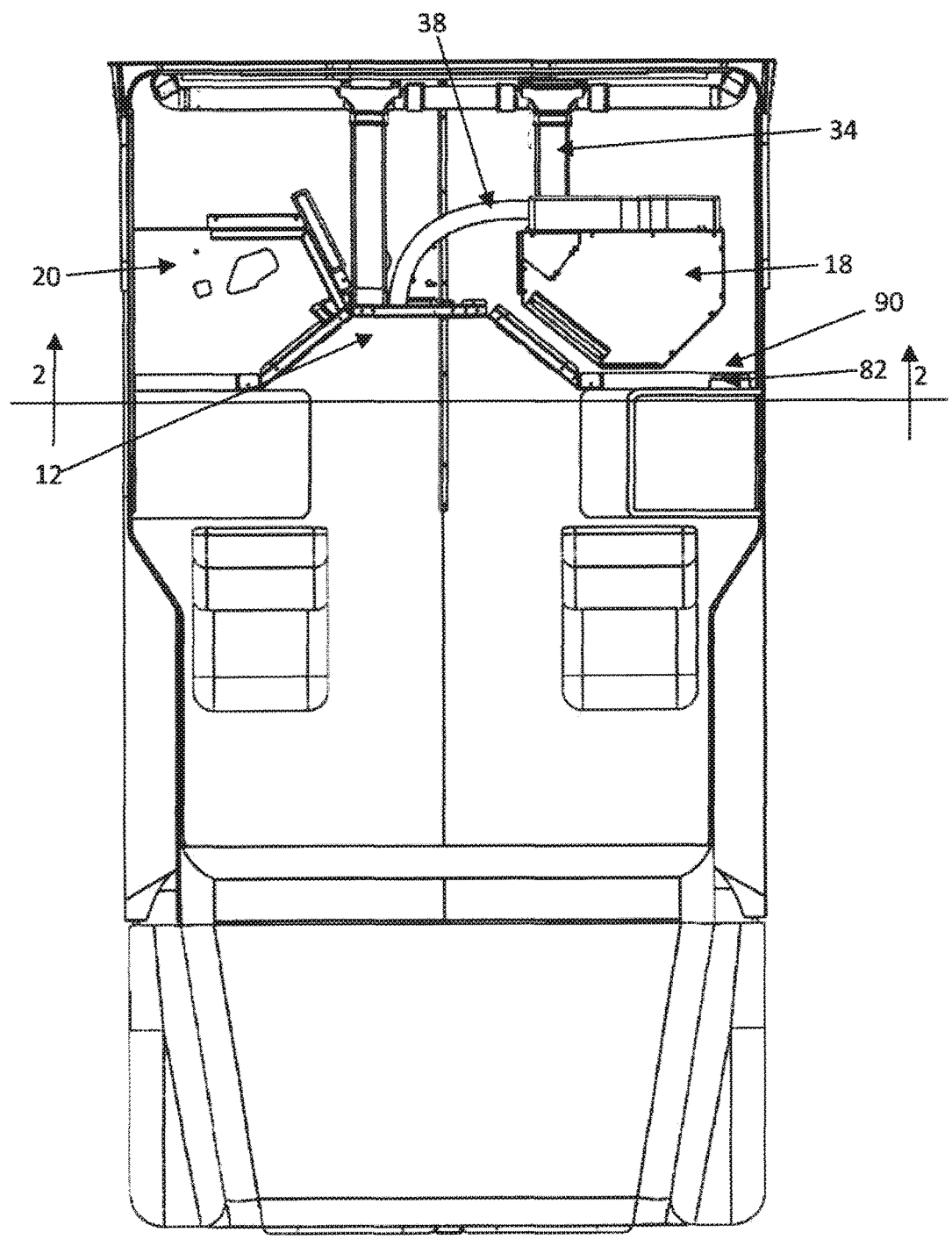
FIG. 1 is a plan view showing a prior art diesel powered air conditioning unit and an auxiliary HVAC unit in accordance with the present invention installed in a sleeper compartment of a truck.

Referring to the drawings more particularly by reference character the present invention provides a battery powered, integrated auxiliary HVAC system 10 to heat and cool at least a sleeper compartment 12 of a vehicle such as a truck 14. As shown in FIG. 1, sleeper compartment 12 is located in an extended cab behind the driver and passenger seats and includes a bunk 16 together with space for other amenities such as a refrigerator, microwave, television and the like. A portion of auxiliary HVAC system 10 is housed in an enclosure 18 positioned under bunk 16 on the driver's side. A diesel powered A/C system 20 may also be provided on the passenger's side for use where not prohibited.

Figure 12:
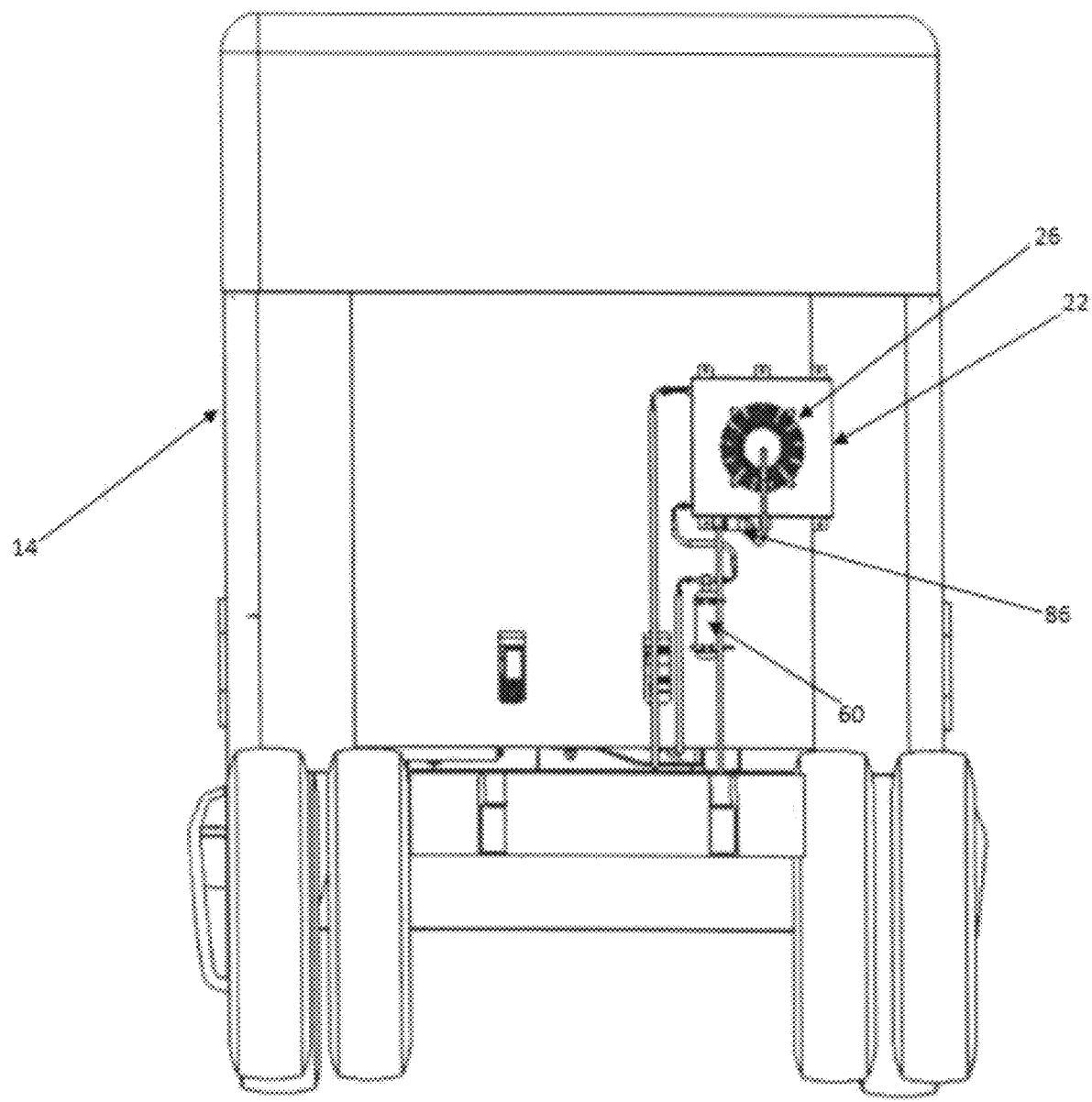
FIG. 12 is an elevation of the condenser portion of the secondary HVAC unit mounted on the rear of a truck.
Figure 13:
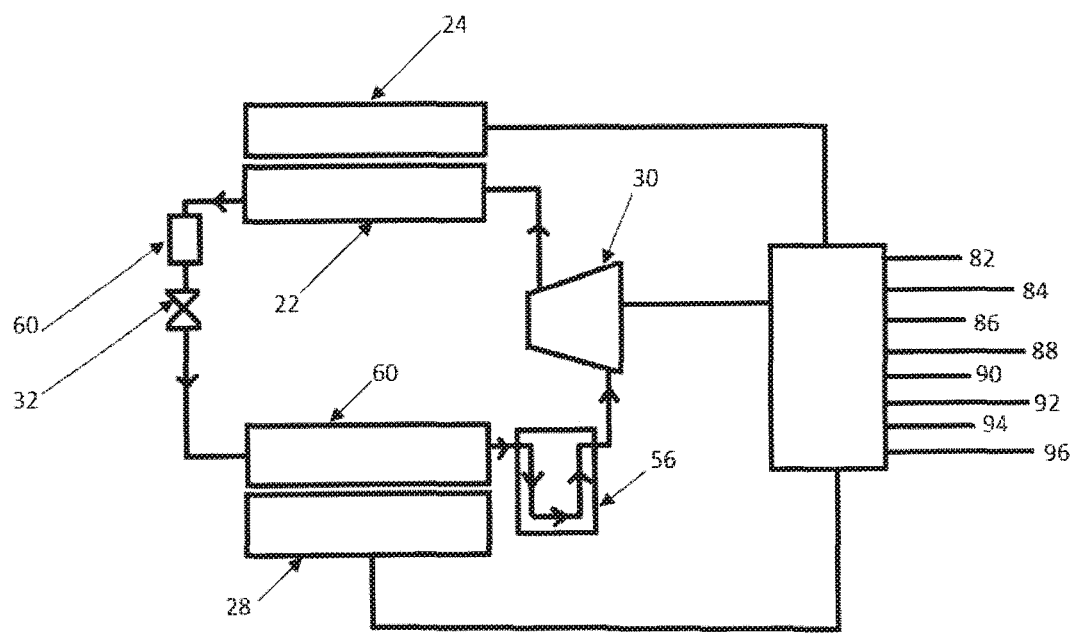
FIG. 13 is block diagram of the evaporator and condenser portions of the integrated HVAC unit.

The A/C portion of auxiliary HVAC system 10 as shown in FIG. 13 includes a condenser coil 22, a condenser fan 24, an evaporator coil 26, an evaporator fan 28 and a compressor 30. A thermal expansion valve 32 is provided between the condenser coil 22 and the evaporator coil 26. For use as described below, condenser fan 24, evaporator fan 28 and compressor 30 have variable speed motors. Evaporator coil 26, evaporator fan 28 which pulls air through the enclosure and compressor 30 are contained in enclosure 18 and condenser coil 22 and condenser fan 28 are hung on a back of truck cab as shown in FIG. 12. The heating portion of auxiliary HVAC system 10 is also housed in enclosure 18 as more particularly described below.

Figure 2:
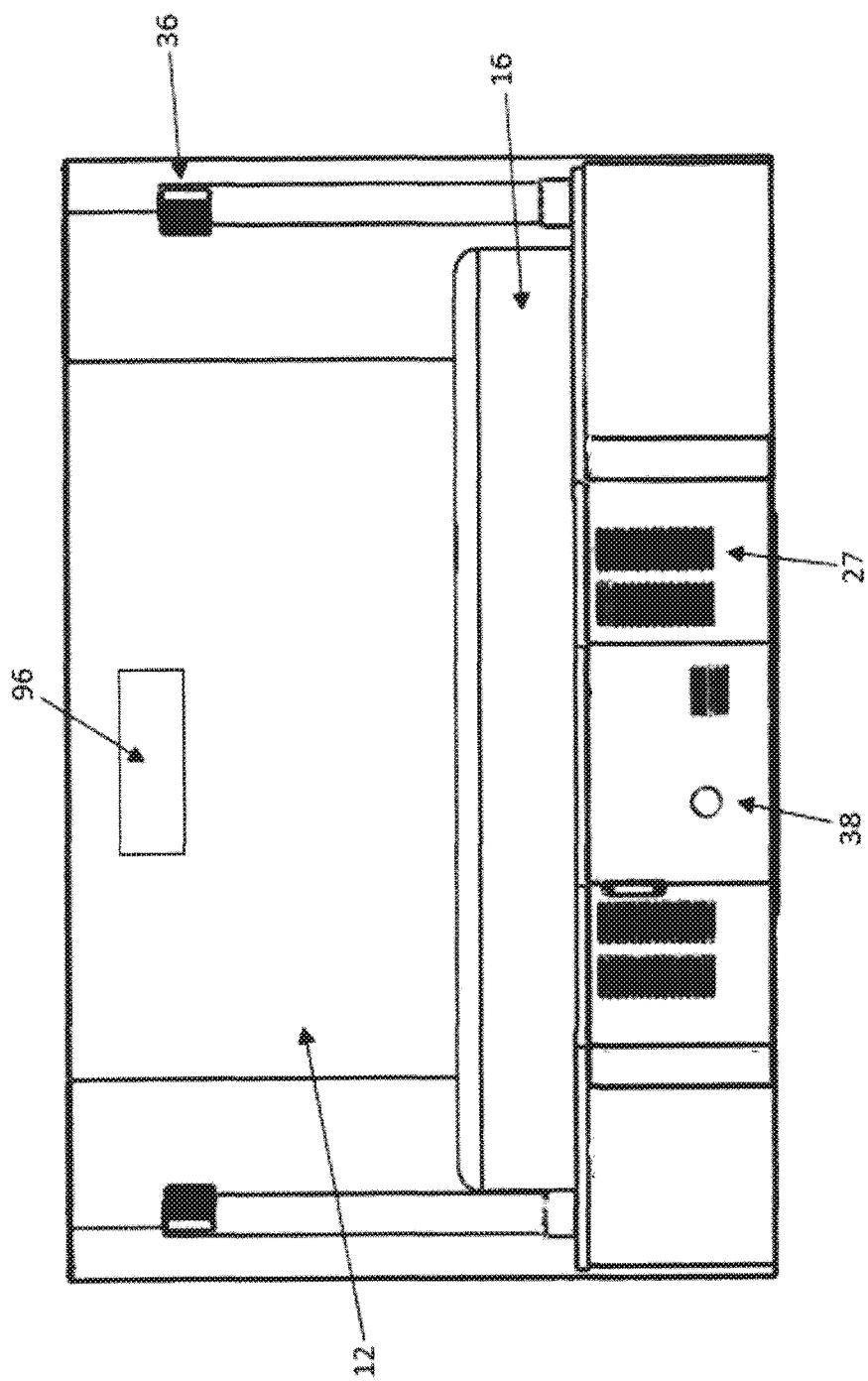
FIG. 2 is a sectional view taken along the plane of 2-2 in FIG. 1.

As shown in FIG. 1, auxiliary HVAC system 10 uses a common duct 34 also used by diesel powered A/C system 20 for distributing cooled air from enclosure 18 to vents 36 located above bunk 16. Duct 34 is also used for distributing heated air through vents 36 plus through an additional duct 38 (FIG. 2) which is directed towards the floor for use in heating the floor. As shown in FIG. 2A, a deflector curtain 40 may be provided to guide air flow from vents 36 back into enclosure 18.

Figure 3:
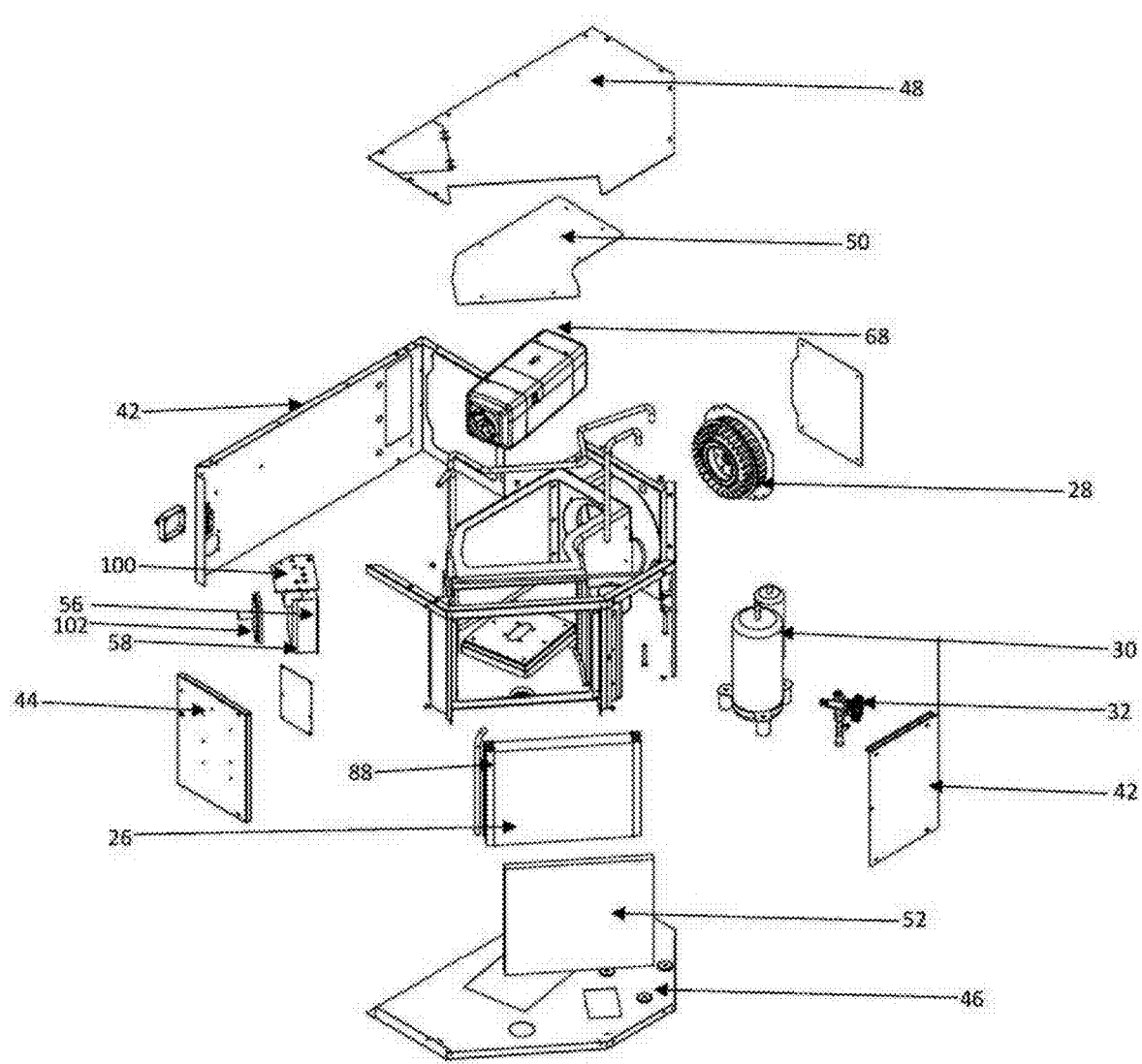
FIG. 3 is an exploded perspective view of the evaporator portion of the HVAC unit.
Figure 4:
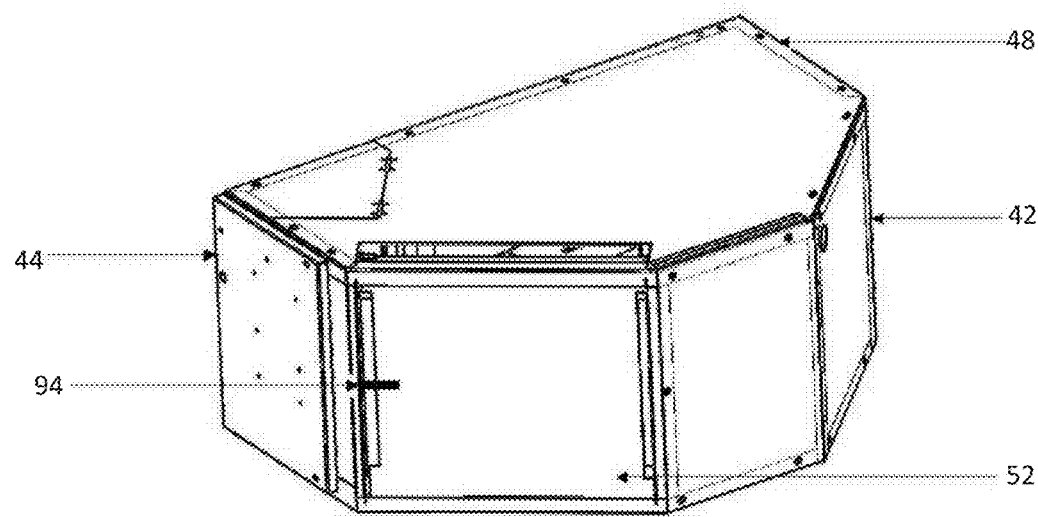
FIG. 4 is an exterior perspective view of the evaporator portion.
Figure 5:
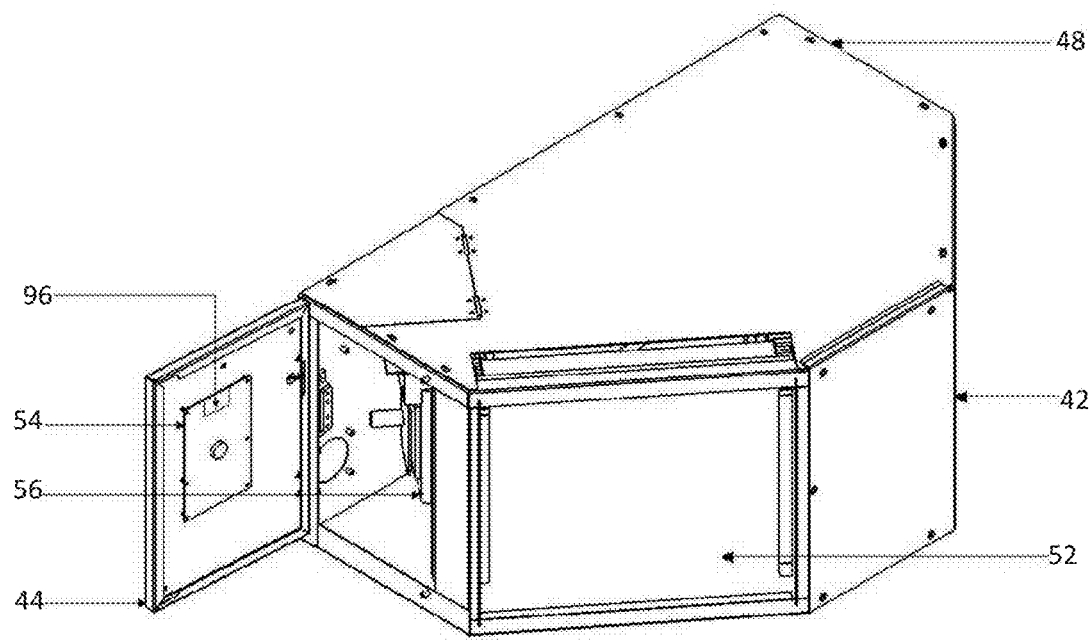
FIG. 5 is a perspective view of evaporator portion with a door open.
Figure 6:
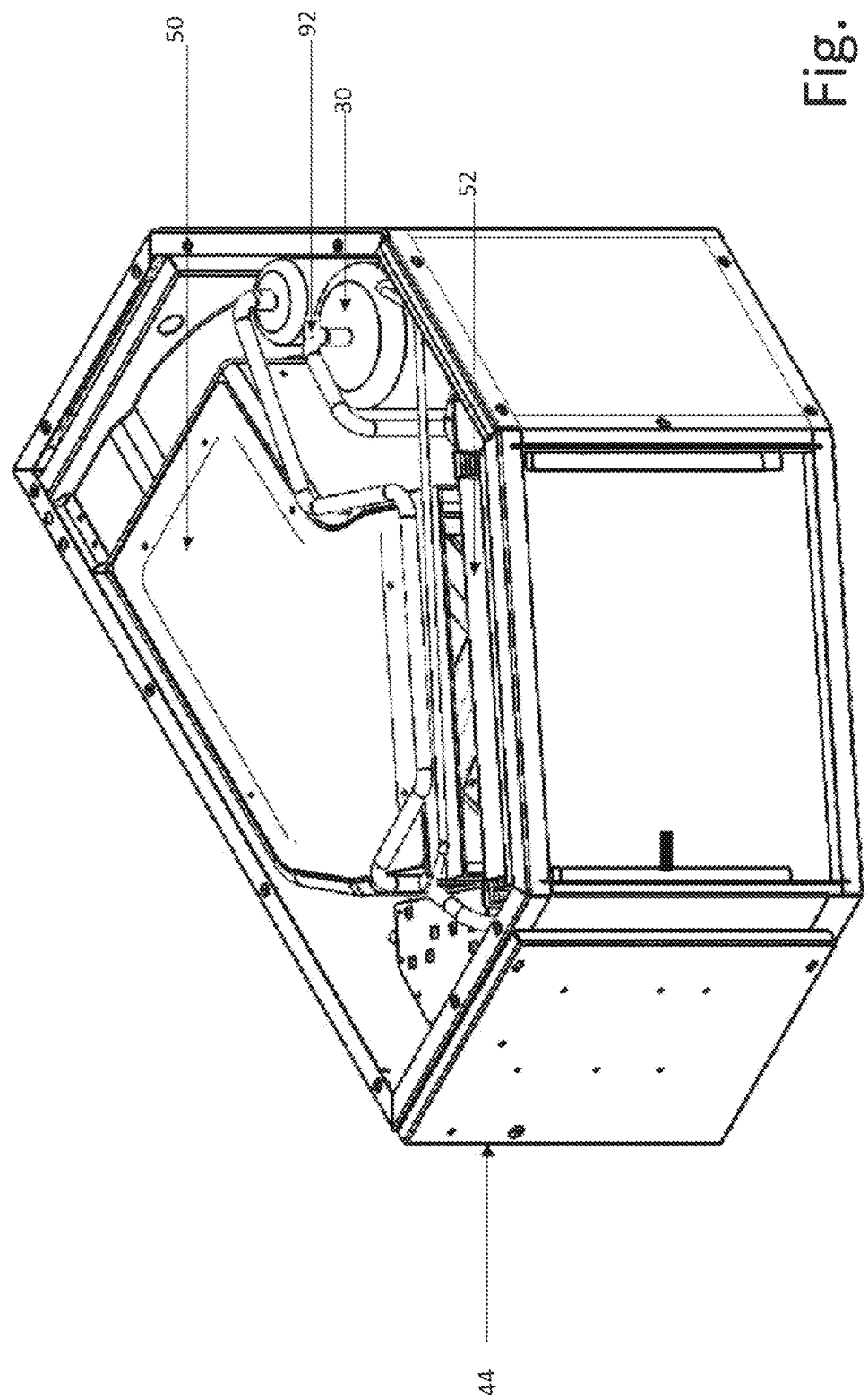
FIG. 6 is a perspective view of the evaporator portion with a top cover removed.
Figure 7:
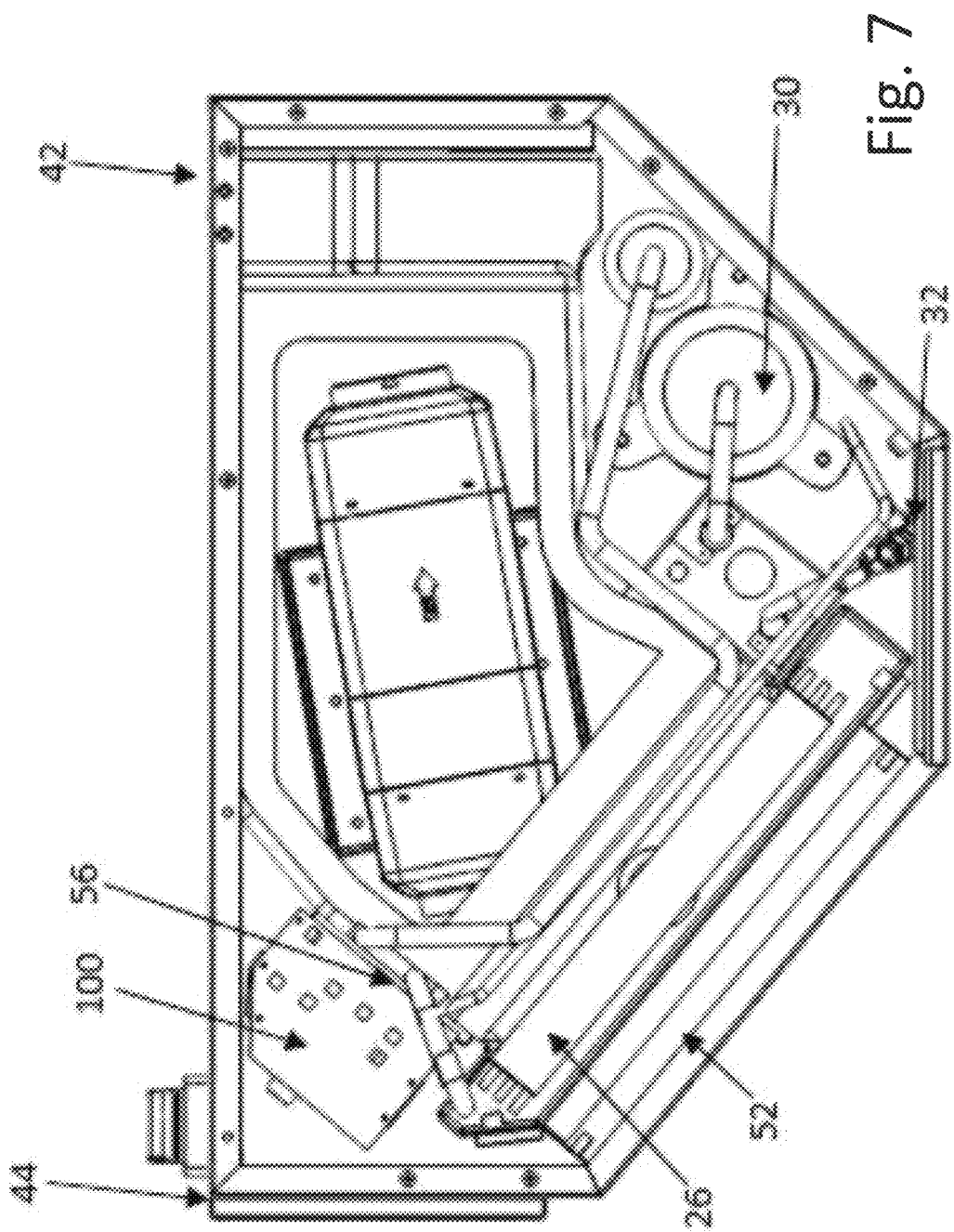
FIG. 7 is a plan view of the evaporator portion with the top cover and an insulation pad removed.

Referring to FIGS. 3-7, enclosure 18 includes side walls 42 with a processor access door 44, a bottom plate 46 and a top cover 48 shown exploded apart in FIG. 3, assembled in FIG. 4 and with access door 44 open in FIG. 5. In FIG. 6, top cover 48 is removed from enclosure 18 and in FIG. 7 a foam pad 50 is removed under top cover. A replaceable filter 52 is positioned in front of evaporator coil 26 with a condensate tray positioned below. A processor 54 is mounted on the inside of access door 44 for use as described below.

Tubing connects cooled high pressure refrigerant exiting condenser coil 22 under control of thermal expansion valve 32 to an inlet of evaporator coil 26. As the refrigerant passes through evaporator coil 26 it changes state to a gas which exits the evaporator coil and is passed through tubing in thermal contact with a heat sink 56 for use in cooling a power booster 58 and associated circuit boards as described below. High temperature/high pressure gas from compressor 30 is passed to condenser coil 22. Air is passed over condenser coil 22 by condenser fan 24 to cool the gas which is converted back into a liquid, passed through a dryer 60 and the refrigeration cycle begun again.

Figure 9:
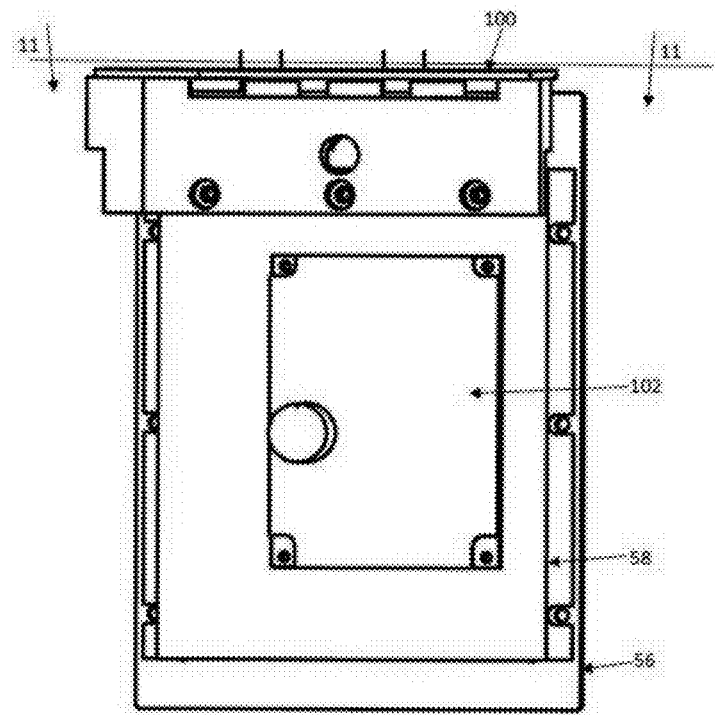
FIG. 9 is a front elevation of a power booster, compressor driver and electronic board mounted on a heat sink.
Figure 10:
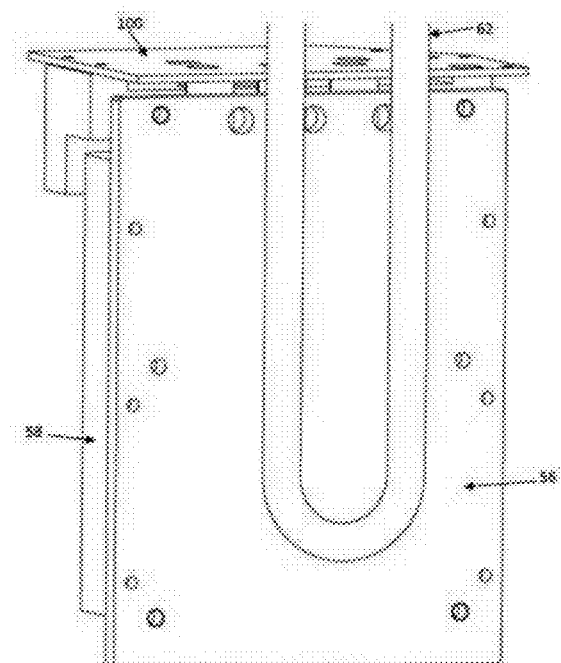
FIG. 10 is a rear perspective view of the heat sink in thermal contact with vaporized refrigerant exiting the evaporator.
Figure 11:
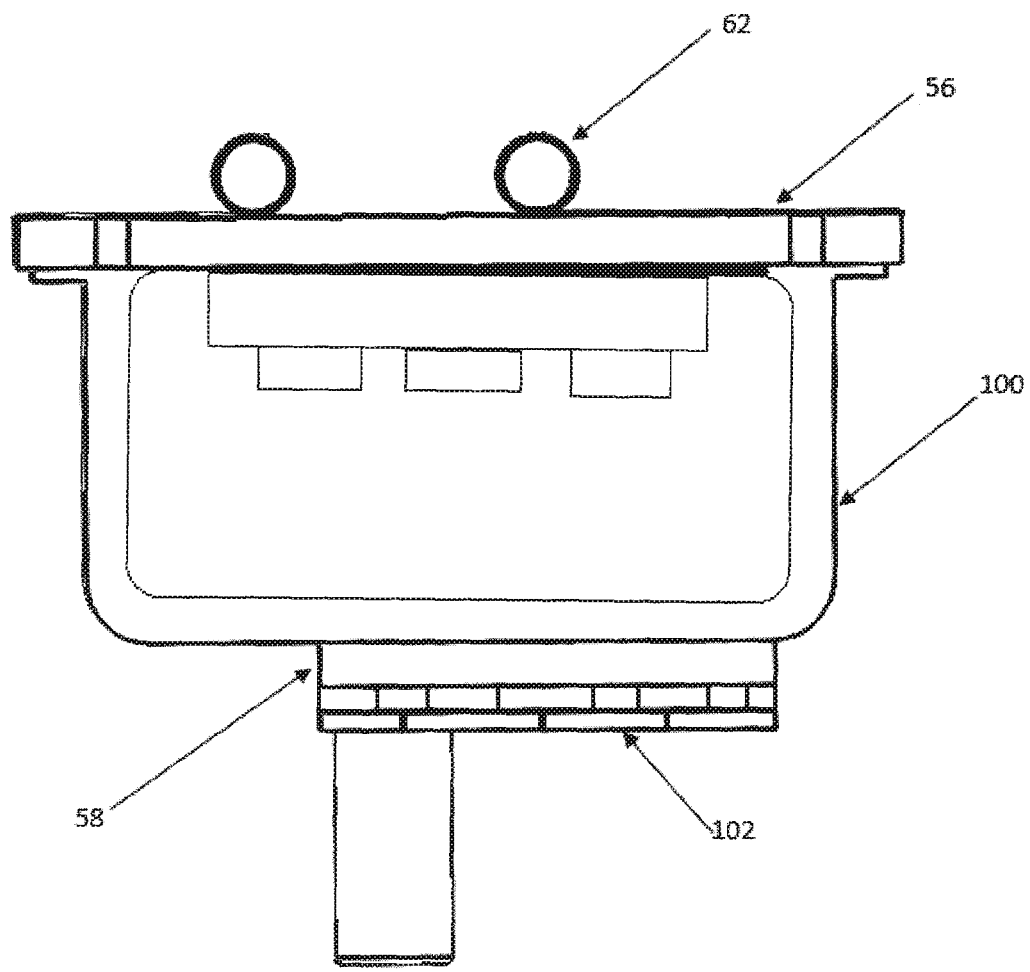
FIG. 11 is a top view of the heat sink taken along the plane of 11-11 in FIG. 10 showing heat flow.

As seen in FIG. 9, refrigerant inlet 62 for heat sink 56 exits from evaporator coil 26 and is passed in thermal contact with heat sink 56. Mounted on heat sink 56 is power booster 58 for converting 12 volt battery power to other voltages as may be required such as by compressor 30 and evaporator fan 28 or condenser fan 24. An electronic board 64 for compressor booster and a compressor driver 66 are also attached in cooling relationship with heat sink 56 as shown in FIG. 11.

Figure 8:
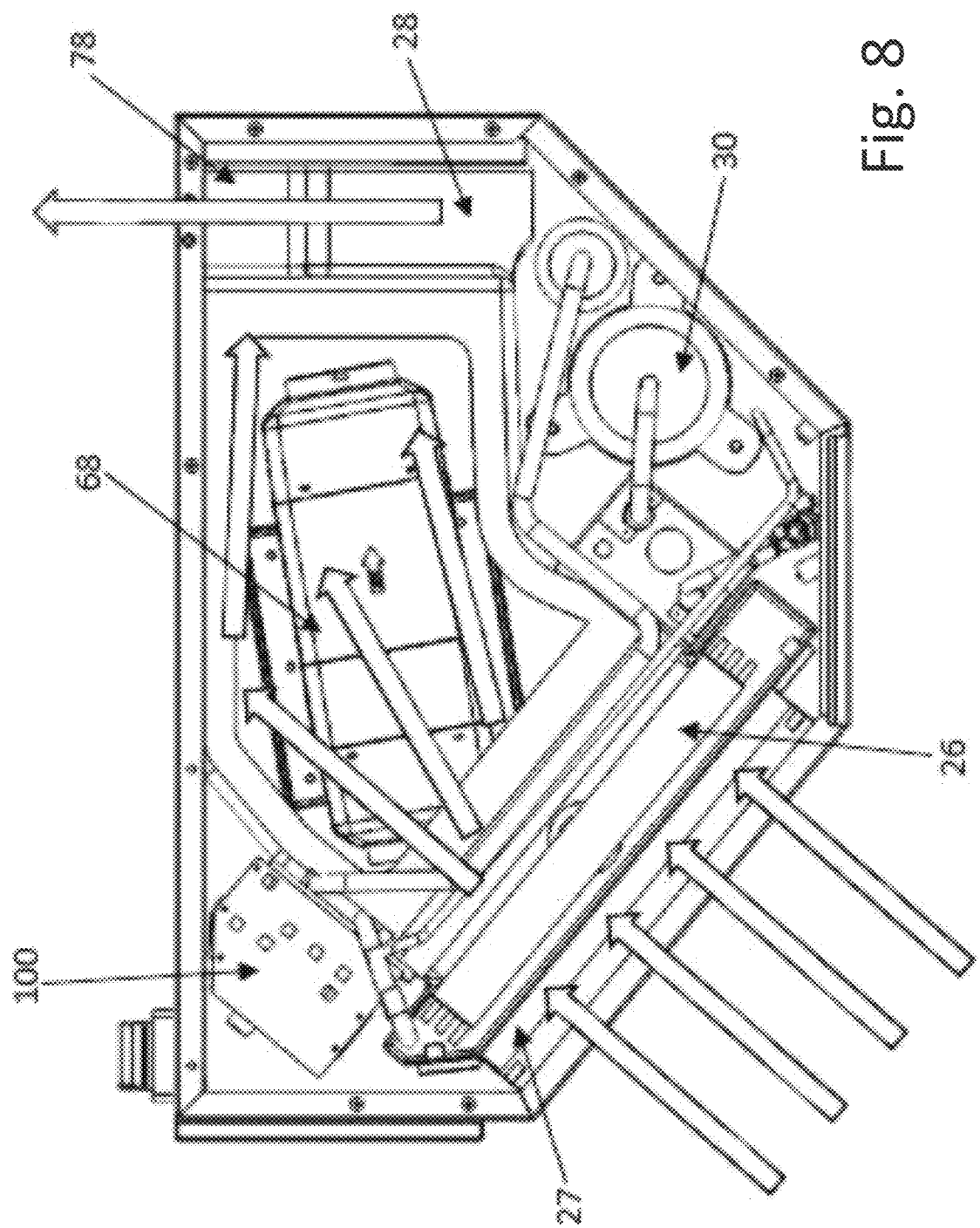
FIG. 8 is a schematic showing air flow through the evaporator portion.
Figure 14:
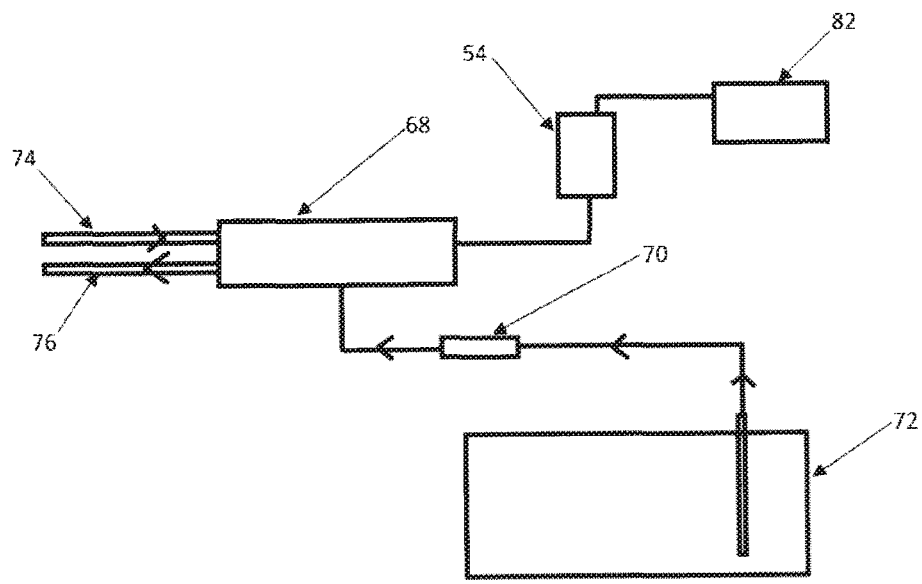
FIG. 14 is a block diagram of a fuel fired heater integrated into the evaporator portion of the auxiliary HVAC unit.
Figure 15:
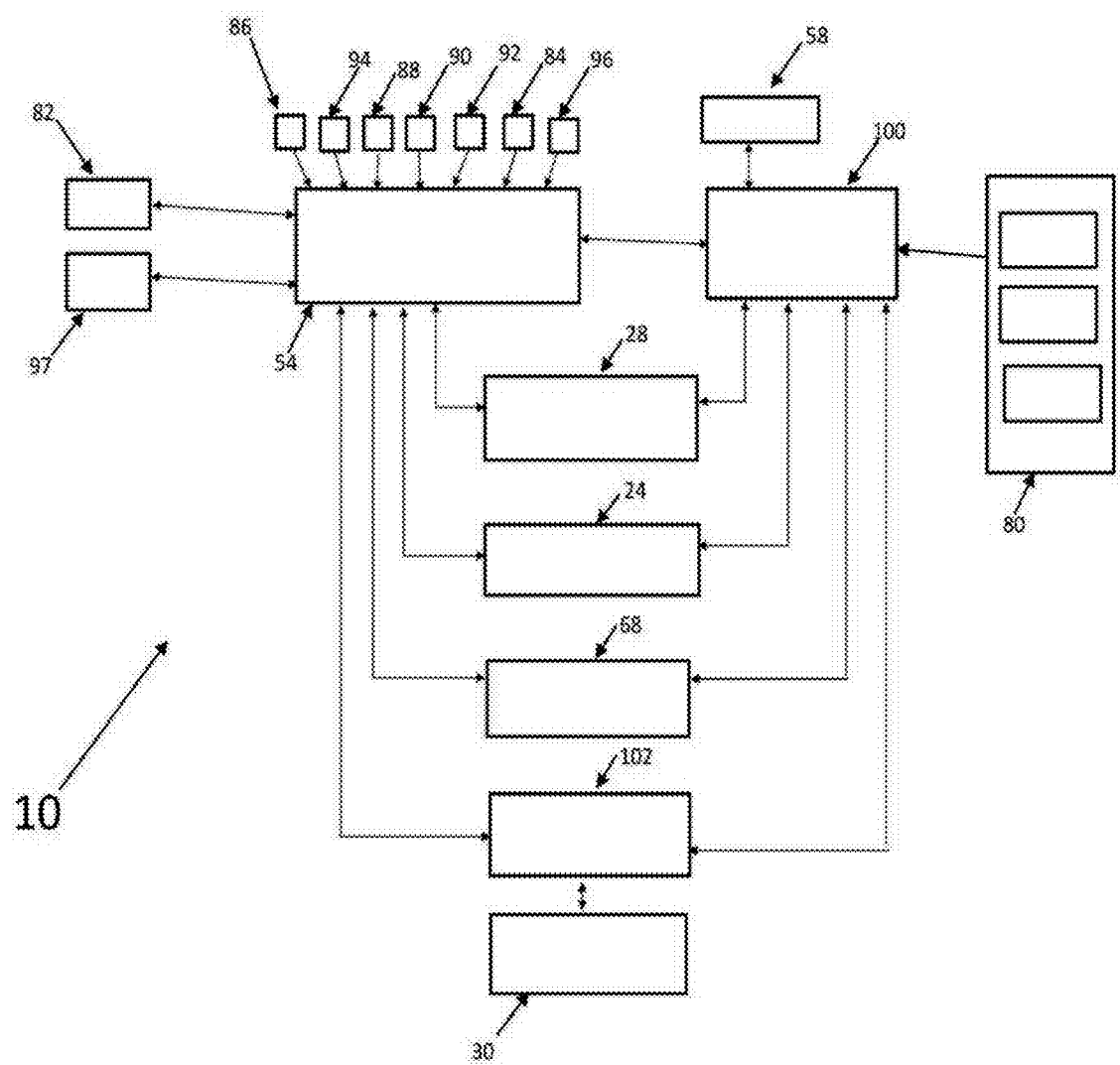
FIG. 15 is flow diagram of a controller for the auxiliary HVAC unit.
Figure 16:
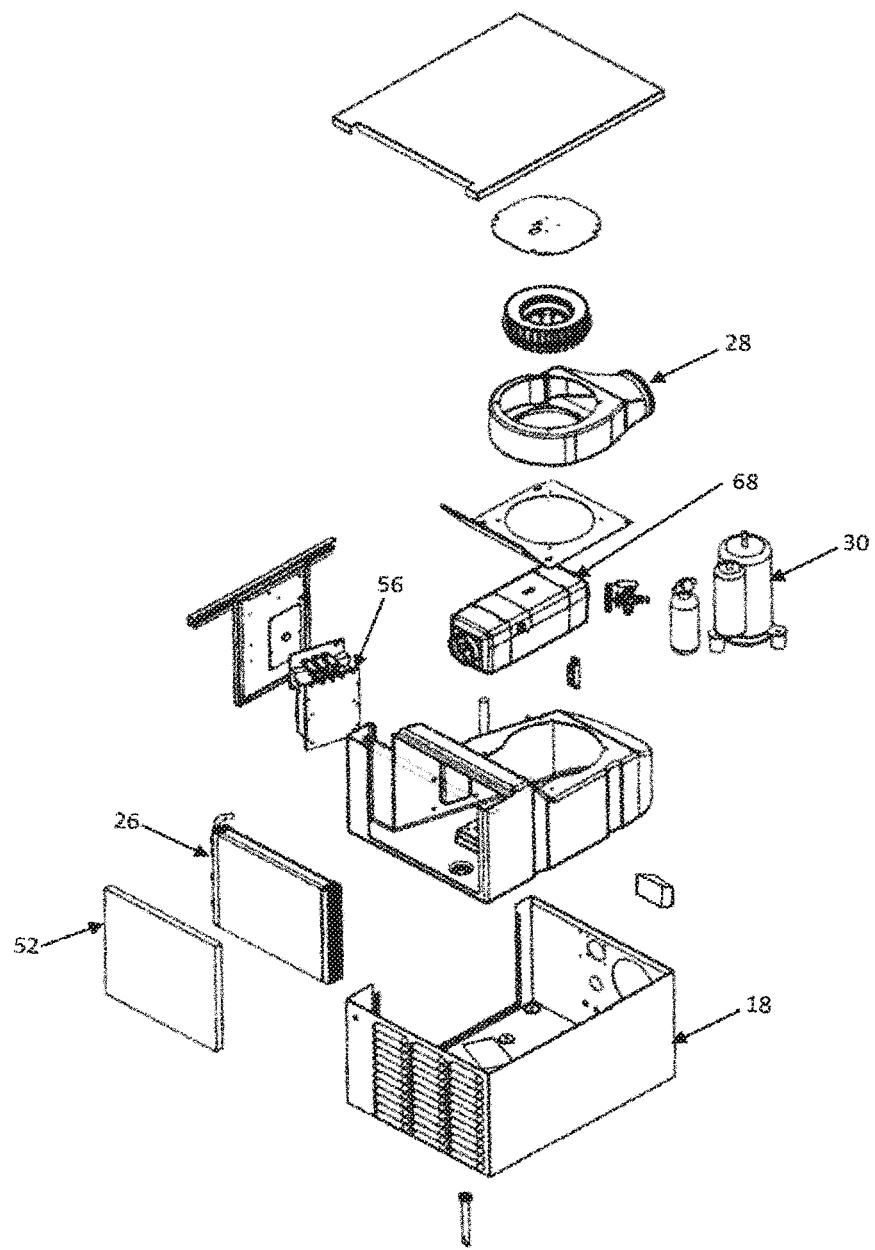
FIG. 16 is an exploded perspective view of the evaporator portion of a second auxiliary HVAC unit.

A forced air, fuel powered heater 68 is position on bottom plate 46 of enclosure 18. As shown in FIG. 14 a fuel pump 70 draws fuel from a fuel tank 72. An air inlet 74 (FIG. 14) is provided under truck 14 upstream of an exhaust outlet 76. As seen in FIG. 8, evaporator fan 28 is located in an outlet 78 of enclosure 18 such that air drawn through evaporator coil 26 is passed around and through fuel powered heater 68. Fuel powered heater 68 has a fan in the inlet of the heater facing evaporator coil 26 for drawing air into the heater and forcing it towards enclosure outlet 78.

The above described integrated auxiliary HVAC system 10 is under control of processor 54 as detailed below. Processor 54 provides an independent system for controlling heating, cooling and air circulation in sleeper compartment 12 when the truck engine is off and system 10 is using a DC battery power source 80. Since power for the system is of fixed quantity owing to the defined size of the battery source, management of the battery resource is necessary to achieve optimal user comfort in terms of temperature and humidity control for the period of use. For this purpose, processor 54 interfaces with a human machine interface (HMI 82) and a plurality of system sensors. HMI 82 is located in sleeper compartment 12 (FIG. 1) and includes switches that allow a user to dial in a desired temperature (set point temperature) and evaporator fan 28 speed.

Inter alia, the sensors communicating with processor 54 include one or more of: ACC 84 (accelerometer), AAT 86 (ambient air temperature), ECT 88 evaporator coil temperature), CT1 90 (cabin temperature), CDT 92 (compressor discharge temperature), RAT 94 (return air temperature) and ROS 96 (room occupancy sensor): ACC 84 (FIG. 5) includes a motion sensor in accelerometer mounted on processor access door 44. If the vehicle is in motion, the needs of the driver are satisfied by the primary HVAC system. To avoid unnecessary wear on compressor 30, processor 54 will shut auxiliary HVAC system 10 down on signal from ACC 84 that vehicle 14 is in motion.

AAT 86 (FIG. 12) measures the temperature of the ambient air proximate condenser coil 22. Depending on the temperature sensed, processor 54 sends a speed signal to condenser fan 24 in combination with a motor speed signal to compressor 30. When both compressor speed and ambient temperature are high, condenser fan 24 speed is also high. When either the compressor speed is low or the ambient temperature is low, processor 54 may lower the condenser fan 24 speed. The temperature sensed by AAT 86 may also be used by processor 54 to make predictions about how much energy will be required to heat or cool sleeper compartment 12 for a prescribed period of time. In general, the further the temperature sensed by AAT 86 is from the set point temperature, the more energy will be required.

ECT 88 (FIG. 3) monitors the temperature of evaporator coil 26. Depending on this value, processor 54 sends a signal to compressor 30 to speed up or slow down to reach the set point temperature. The signal from ECT 88 is also used by processor 54 to adjust the air speed of evaporator fan 28 in order to optimize system performance while maintaining optimal occupant comfort as that air speed determines air flow through vents 36.

CT1 90 (FIG. 1) monitors the temperature in sleeper compartment 12 above bunk 16. The measured temperature difference between CT1 90 and RAT 94 is used to start and stop operation of auxiliary HVAC system 10 when heat or cooling is required. Also processor 54 uses the measured temperature difference to drive the system components to produce more or less heating or cooling depending on how far the set point temperature is away from the measured temperature.

CDT 92 (FIG. 6) acts as a safety switch. If there is a loss of refrigerant because of leaks, compressor 30 may overheat and eventually fail. The temperature measured by CDT 92 may be used by an operator of auxiliary HVAC system 10 to prevent compressor 30 failure. Processor 54 may be programmed to compare the measured temperature with an expected value for ideal operation. If the measured value is higher than the expected, processor 54 may provide the operator with an error code than there is a developing problem thereby giving the operator an opportunity to take action. Processor 54 may be further programmed to shut auxiliary HVAC system 10 down if the expected value and the measured value exceed a predetermined threshold.

RAT 94 (FIG. 4) measures the return air temperature before the air enter evaporator coil 26. The temperature measured at this point is a good representation of the sleeper compartment temperature.

ROS 96 (FIG. 2) is an occupancy sensor, preferably (but not necessarily) a lensless smart sensor such that occupant privacy is not compromised. If sleeper compartment is unoccupied for a predetermined period of time, for example if the driver uses a truck stop facility to eat, shower or the like, processor 54 may be programmed to shut auxiliary HVAC system 10 down or to allow the temperature measured by RAT 94 to rise above (during a cooling cycle) or fall below (during a heating cycle) the set point temperature.

Figure 2B:
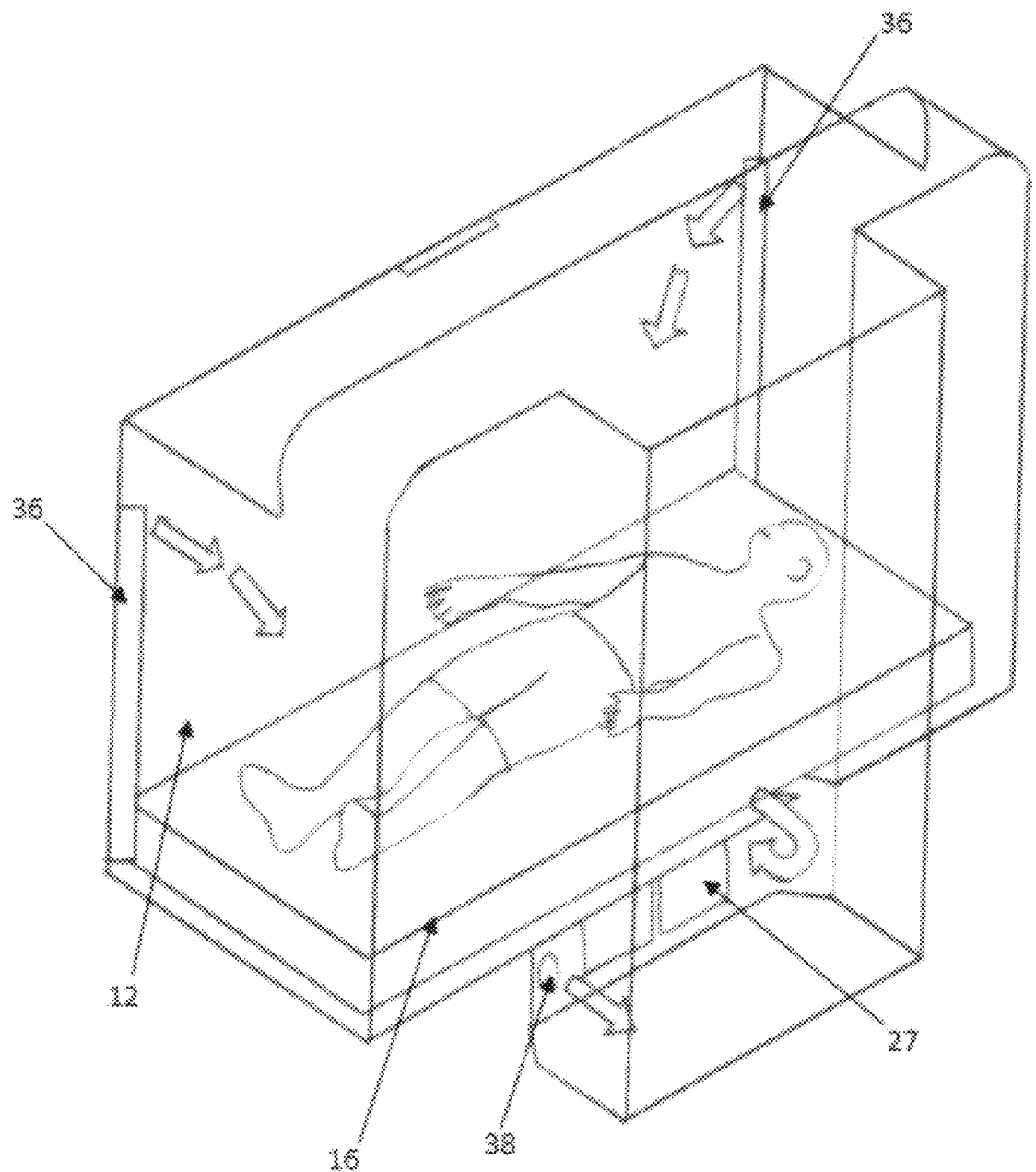
FIG. 2B is a diagram showing modular air flow over a person lying on a bed in the sleeper compartment.

In use auxiliary HVAC system 10 implements a hardware arrangement and control strategy to maintain driver comfort when sleeping and while moving about the sleeper compartment 12. One method of achieving improved driver comfort while reducing overall system load is by zone heating/cooling the occupant. This method directs conditioned air toward and around the occupant as shown in FIGS. 2A and 2B in such a way that the air provides comfort to the driver with little regard to the rest of the living space. For cooling, the occupant will feel cooler when conditioned air is blowing over the head and arms. Superior cooling and thus comfort will be achieved if the body of the occupant has a uniform but low velocity breeze of cool air blowing over it. When vents 36 are arranged such that a laminar flow of cool air gently falls across the occupant, the occupant will realize adequate comfort. When enclosure inlet 27 is arranged to fully capture the cool air there is little mixing with the rest of the cabin air and therefore little cooling is wasted to maintain the entire cab box. Air flow can be optimally directed by using moveable curtains, deflector panels 98 or discharge ports in sleeper compartment 12 to maximize driver comfort while minimizing air mixing within the cab. Additional higher velocity airflow can be directed at the driver's head and arms to provide improved comfort. When the occupant is awake and moving around within the cab, they may desire more of the cabin space to be conditioned to achieve adequate comfort. This can be accomplished by changing the distribution of air within the cab by simply increasing the air velocity (and therefore cool air/warm air mixing) or by better controlling the airflow with air duct control valves. The valves may be set manually by the occupant, can be operated by a timer device or by processor 54 in response to motion detectors. In the case of the motion detection system, motion from the occupant can signal processor 54 that the driver is awake to increase airflow or change the ducting arrangement to better cool the occupant in more of sleeper compartment 12 than required by a sleeping occupant.

The invention disclosed implements a novel control strategy to maintain optimal runtime with a limited battery capacity. For this purpose, the algorithm used by processor 54 can be implemented in several ways however the high level goal is to estimate the total energy required to operate for a specified operation time (such as 10 hours) using measured and inferred environmental parameters and adjust control parameters to achieve the desired runtime without exceeding the estimated available energy. This feat is nearly impossible for a truck driver to achieve manually since the power requirements of a HVAC system change as a function of ambient temperature (which changes over a typical diurnal event), internal heat generation, specific solar loading and thermal loss through the truck cab. Active dynamic control of auxiliary HVAC system 10 during operation is therefore desirable. In one such implementation, the algorithm uses a start time when the A/C is first turned on and then estimates the change in ambient temperature and solar loading over the run time event which may have an assumed duration or may be prescribed by the user (for instance 10 hours). Processor 54 estimates the amount of available power by knowing how many batteries 80 (FIG. 14) are available and knowing the capacity of each and state of charge of the energy storage system as a whole. Processor 54 estimates the amount of energy required to achieve the desired runtime while maintaining desired temperature/comfort control. If the stored energy is the same or exceeds the energy estimate required to run the system for the desired length of time, auxiliary HVAC system 10 runs to provide maximum comfort control to the occupant. When the stored energy is less than the estimated amount of energy required, an algorithm can optimize runtime in several ways. For instance, processor 50 can raise the set point temperature of the sleeper compartment 12. For air conditioning this lowers the temperature difference between the inside of sleeper compartment 12 and outside and therefore lowers the total amount of energy required to cool the cab. Another way to increase the runtime is to lessen the restrictions on temperature control. In this case, processor 54 turns off compressor 30 and condenser fan 24 when the set point temperature is achieved and lowers evaporator fan 28 speed. Processor 54 may allow the sleeper compartment temperature to raise a higher than normal temperature before compressor 30 and condenser fan 24 restarts. Longer off time saves energy. Another way processor 54 can optimize energy consumption is by allowing the evaporator coil 26 temperature to rise, for example from 35 degrees F. to 55 degrees F. A higher evaporator coil 26 temperature allows a higher suction pressure (using the temperature difference mentioned above and R134a as the refrigerant, saturated suction pressure raises from 45.5 PSI to 64.3 PSI) and therefore reduced pressure difference across compressor 30 which requires less power to maintain (assume the saturated condenser pressure is the same for both cases and fixed at 181 PSI for R134a, the pressure ratio for a low evaporator temperature is 181/45.5=3.97 while the higher evaporator pressure has a pressure ratio of 181/64.3=2.81). A first way this is done by lowering compressor 30 motor speed for a given evaporator fan 28 speed. A second manner to achieve higher evaporator coil 26 temperature is by raising the evaporator fan 28 speed for a given compressor 30 speed. Yet a third way to achieve a higher evaporator coil 26 temperature is by actively controlling thermal expansion valve 32 and modulating the refrigerant flow admitted to evaporator coil 26. Each way to achieve higher than normal evaporator coil 26 temperature can be used independently or in various combinations.

The control algorithm for processor 54 can be further enhanced by gathering more information about the HVAC requirements in advance of an operation event. Such information can include but is not limited to: driver input to estimate desired run time, comfort parameters such as min/max temperature and humidity and whether the occupant prefers warmer/cooler air when the system first starts or later in the run. Additional information provided processor 54 may include actual climatological data from sensors located on the vehicle such as additional temperature sensors, humidity sensors, solar flux sensors etc. Processor 54 may also be provided actual historical and predicted weather data from the internet or other source. This information can be used by processor 54 to anticipate HVAC needs such as anticipated ambient temperature, the likelihood of cloud cover and real solar inclination that the system may be exposed to and thereby budget power accordingly to achieve maximum driver comfort while minimizing power consumption. Processor 54 may also use historical data to make adequate predictions about the power consumption required to maintain occupant comfort. For instance processor 54 can log data from actual use cases and compare previous operational events to the current event. Processor 54 may use stored time of day, battery condition and use expectations to decide whether previous similar operational events were successful or not and adjust the current run accordingly. Processor 54 can gather user preferences from the occupant such as desired run time, desired control temperature, desired control tolerance, desired maximum and minimum air flow. This information can be gathered optimally by interfacing via a wireless or wired connection to an external electronic device 97 such as a phone, tablet or computer. Auxiliary HVAC system 10 can also provide information to the occupant, owner or maintenance professional that has active concern about vehicle 14 through the same communication link. Some types of information that auxiliary HVAC system 10 typically provides include total and statistical data about system run time and ambient conditions. The system can also provide information about the state of health of auxiliary HVAC system 10 and batteries 80 alerting of run time alarms or out of parameter operation. In some cases, auxiliary HVAC system 10 can even anticipate the need for future maintenance when it is able to trend past performance and make predictions about future operation. Further, information auxiliary HVAC system 10 performance history and predictions about future performance can be collected and consolidated in a centralized location so that the maintenance staff can easily understand the condition of their fleet and assign the appropriate maintenance accordingly.

Allowing a higher evaporator coil 26 temperature does have some negative effects to air conditioning system. For instance a relatively higher evaporator temperature (55 degrees F. instead of 35 degrees F.) reduces the temperature between the conditioned space air and the evaporator. For a given airflow, the reduced temperature difference between air and evaporator coil 26 will consequently reduce the amount of heat transfer that occurs. In this case, capacity of auxiliary HVAC system 10 is reduced. In most cases however, the air conditioning system does not need to operate at maximum cooling capacity and can be operated at partial capacity to maintain adequate temperature control. In this case, the relatively higher evaporator coil 26 temperature is desirable to simultaneously achieve temperature control while reducing power consumption. Another disadvantage to operating with a relatively higher evaporator coil 26 temperature is that it reduces the air conditioner's ability to remove humidity in the conditioned space.

In this mode of operation, the invention allows the evaporator coil 26 temperature to rise to higher than normal temperature (for instance 55 F instead of 35 F). When the evaporator coil 26 is operating at higher than normal temperature, the saturated suction pressure of the refrigerant within is also higher which allows the compressor 30 suction pressure to rise. Higher compressor 30 suction pressure reduces the overall pressure difference across the compressor and thereby reduces the power required to maintain the pressure difference. This control mode thereby saves energy. The consequence of running an air conditioning system with higher than normal evaporator coil 26 temperature is that the air conditioning system has reduced ability to remove humidity in the conditioned air. American Society of Heating, Refrigeration and Air-Conditioning Engineers (ASHRAE) recommend a relative humidity of 50% to 60% for temperatures of 74F for optimal human comfort. When the humidity exceeds this value, humans tend to sweat more or feel cool but clammy. Both situations yield a poor perception of comfort. Controlling humidity in sleeper compartment 12 is a unique situation in that there is a known and fixed source of humidity which is that of the occupant respiration. In this case, auxiliary HVAC system 10 does not need to continually remove humidity from cabin air but can do this periodically at a rate that is consistent with humidity production. Therefore, the invention described operates such that the evaporator coil 26 primarily operates at a higher relative temperature such as 55F to satisfy temperature control requirements although humidity removal at this temperature is at best 50% relative humidity. Processor 54 periodically reduces the evaporator coil 26 temperature to a lower value, for example 45 F, to easily condense humidity and bring the relative humidity to an ideal value of 35% RH for the air that passes through the evaporator coil 26. When the cool dry air mixes with the higher humidity in the air in the cab, the net effect is to remove the accumulated humidity within the conditioned space and improver the comfort index while maintaining temperature control. Adjusting the temperature can be initiated in several manners such as a time based system where the air conditioning system operates with a relatively higher evaporator coil 26 temperature for a time period. The air conditioning system then changes one or more control parameters to allow the evaporator temperature to be reduced for a period. Once the relative humidity of the conditioned air is reduced, the evaporator temperature is allowed to return to a higher value and continue maintaining temperature control. Sensors may be employed to initiate this humidity removal cycle. As an example, humidity sensors are commonly available and can be used to initiate the humidity reduction cycle where the humidity sensor measures a relative humidity, e.g. 60% RH, and begins the humidity reduction cycle. The cycle continues until the relative humidity of the conditioned space reaches, e.g. 50% RH, and processor 54 commands the air conditioning components allow a higher evaporator temperature and thereby maintain temperature control. Advanced control schemes allow the system to balance low power operation, humidity removal and temperature control needs by adjusting the evaporator coil 26 temperature as the situation requires such that the control scheme seeks an optimal evaporator coil 26 temperature to simultaneously achieve low system power consumption and adequate temperature/humidity control. Such a control algorithm may make assumptions about the humidity production from the occupant, air leakage and other sources of humidity within the cab at various times of day and acting accordingly. The scheme can be further refined by adding manual inputs to the control from the occupant to select more or less humidity as the occupant desires. The scheme can be further refined by adding sensor measurements and thereby providing closed loop control of the humidity within sleeper compartment 12.

The invention discloses fuel-fired heater 68 integrated with the air conditioning system such that enclosure inlet 27, evaporator fan 28, and vents 36 in duct 34 are common and used to distribute heat or cooling in sleeper compartment 12. Fuel-fired heater 68 is located in enclosure 18 within the common airflow path of air flowing through evaporator coil 26. Fins may be provided in enclosure 18 to direct the airflow before (or after) entering fuel-fired heater 68 in a manner to promote heater efficiency and performance while minimizing noise. The fins may be used to: (1) locate and position the combustion chamber within the auxiliary HVAC system 10, (2) provide heat transfer from fuel-fired heater 68 to the air stream moving over the surface of heater and (3) straighten and direct the airflow into evaporator fan 28 to promote optimal fan performance and efficiency.

By integrating fuel-fired heater 68 into the evaporator portion of the A/C portion of auxiliary HVAC system 10 the invention integrates the hardware required to provide air conditioning and hardware required to deliver heating into one assembly. This feature makes the device much easier to install while also taking up less room in the truck driver's storage space. Currently available systems require a separate HVAC evaporator system and separate heater system. Installation requires that multiple holes be drilled into the truck, multiple wires be run to the two systems and multiple connection tubes be routed to provide air circulation. When the A/C and heating system are integrated, only one hole is required to route refrigerant and electrical lines through the truck cab. Also, only one connection is needed to the truck air conditioning duct 34.

Cooling of electronic equipment associated with low voltage DC air conditioning systems can be a significant problem. Two approaches commonly used are convective cooling of the power electronics by locating the electronics outside of the conditioned space or, convection cooling the electronics inside the conditioned space. Placing electronics outside the conditioned space is a reasonable approach but it can be difficult to protect the electronics from the harsh on-road conditions such as, sand dirt, salt, cleaning chemicals or weather conditions of high ambient temperatures, humidity, ice, water. The alternative is to place the electronics inside the conditioned space. In this case, heat produced by the electronics directly subtracts from the air conditioning systems cooling capacity and is therefore also not desirable. The invention described places power electronics within enclosure 18 where the electronics are protected from the harsh environmental conditions while making provisions to remove heat generated from the components so that they do not significantly reduce the capacity of the air conditioning system. To this end, relatively cool refrigerant gas from refrigerant from evaporator coil 26 is routed through refrigerant inlet 62 to heat sink 56 with high thermal conductivity. Power electronic devices such as an electronic board 100 and compressor driver 102 are mounted to and have excellent thermal coupling to heat sink 56 which is also thermally coupled to the refrigerant gas. As shown in FIG. 11, heat generated by the electronic components flows through heat sink 56 and to the relatively cool refrigerant gas. Heat from the power electronics may then be rejected through the air conditioning condenser coil 22 instead of inside of the conditioned space. An added benefit of this arrangement is that the heat from the power electronics can be used to vaporize any liquid refrigerant in the suction line and ensure no liquid refrigerant is returned to the suction port of compressor 30. Adding heat to the compressor suction gas may have a detrimental effect of raising the compressor discharge temperature. This is a problem when the compressor discharge exceeds the compressor manufacturer recommendations. However, additional control measures can be implemented by processor 54 to ensure that the compressor discharge temperature is not exceeded during extreme operation. One such control approach is to measure the compressor discharge temperature with CDT 92. When a threshold temperature is reached, processor 54 changes the priority of control from cabin temperature control to discharge temperature control. Excess discharge temperature may also be inferred by calculating or estimating the compressor load, compressor efficiency, and the refrigerant enthalpy change across the compressor. One strategy to reduce compressor discharge temperature is to reduce the evaporator air flow and therefore lower the evaporator coil 26 temperature. Reducing the evaporator coil 26 temperature will reduce the compressor suction temperature and consequently reduce the compressor discharge temperature. Another method of lowering the compressor discharge temperature is to reduce the compressor speed. When the speed is reduced, the load is also reduced so heating from the power electronics and compressor motor windings are reduced and therefore the compressor discharge temperature will reduced proportionally. The two strategies may be used independently or in a combined manner to achieve optimal discharge temperature control while maintaining maximum capacity. A third method is to directly inject refrigerant into the suction port of the refrigeration compressor upstream of the power electronic heat exchanger. This can be achieved by over-feeding the evaporator coil 26 by the thermal expansion valve 32 or by adding an additional electrically or mechanically controlled valve and appropriate control from processor 54 or from a mechanical temperature sensor on the compressor discharge port. In this case, the valve shunts high pressure liquid refrigerant before thermal expansion valve 32 to the suction port before the power electronics heat exchanger. The third method is the least desirable method since it can reduce the system efficiency more than the other proposed methods. Each of the methods described can be used independently or in combination to achieve the desired compressor discharge temperature control.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. An integrated HVAC system powered by a DC battery source and adapted to heat and cool at least a sleeper compartment of a truck, said integrated HVAC system including an enclosure in the sleeper compartment with an evaporator coil in an air inlet and an evaporator fan in an air outlet for pulling air through the condenser coil and ducting the air out the air outlet, a fuel fired heater in the enclosure positioned between the evaporator coil and the evaporator fan, said heater having a fan for forcing air through the heater, said enclosure further including a compressor, a power booster for the compressor and an electronic board mounted on the power booster for controlling the power supplied to the compressor by the power booster, said booster mounted on a heat sink in thermal contact with vaporized refrigerant exiting the evaporator coil, said heat sink cooling the power booster and electronic board, the integrated HVAC system further including a condenser and a condenser fan outside the truck, said compressor, evaporator fan and condenser fan having variable speed motors controlled by a processor mounted in the enclosure.

2. The integrated HVAC system of claim 1 wherein the processor can collect real time performance data.

3. The integrated HVAC system of claim 2 wherein the processor is connected to an external data server for passage of the real time performance data to the external data server.

4. The integrated HVAC system of claim 1 wherein the processor is programmed to control the variable speed motors of the compressor, evaporator fan and condenser fan based on temperature data taken by sensors in the sleeper compartment, in air passing into the evaporator coil and in air surrounding the condenser coil.

5. The integrated HVAC system of claim 1 further including a temperature sensor on the evaporator coil.

6. The integrated HVAC system of claim 1 wherein the processor manages the variable speed motors of the compressor, evaporator fan and condenser fan in a manner that a storage capacity of the DC battery source is not exceeded for a given runtime of the system.

7. The integrated HVAC system of claim 1 further including a lensless occupancy sensor in the sleeper compartment coupled to the processor, said processor shutting down the integrated HVAC system or moderating conditioning by the integrated HVAC system on receipt of a signal from the occupancy sensor that the sleeper compartment is not occupied.

8. The integrated HVAC system of claim 1 wherein the truck has a diesel powered A/C system in the sleeper compartment with a ducting system with vents for delivering conditioned air above a bunk in the sleeper compartment, said air flow passing out of the enclosure outlet of the integrated HVAC system ducted into the preexisting ducting system of the diesel powered A/C system.

9. The integrated HVAC system of claim 1 wherein the processor is programmed to control the variable speed motors of the compressor, evaporator fan and condenser fan based on temperature data taken by sensors in the sleeper compartment, in air passing into the evaporator coil and in air surrounding the condenser coil.

10. The integrated HVAC system of claim 9 where additional temperature sensors connected to the processor are provided to measure the temperature of the evaporator coil, the temperature of refrigerant exiting the evaporator coil and refrigerant exiting the compressor.

11. The integrated HVAC system of claim 1 further including an accelerometer coupled to the processor, said processor shutting the integrated HVAC system down on receipt of a signal from the accelerometer that the truck is in motion.

12. The integrated HVAC system of claim 1 further including a lensless occupancy sensor in the sleeper compartment coupled to the processor, said processor shutting down the integrated HVAC system or moderating conditioning by the integrated HVAC system on receipt of a signal from the occupancy sensor that the sleeper compartment is not occupied.

* * * * *